US008831582B1

(12) United States Patent
Haid et al.

(10) Patent No.: US 8,831,582 B1
(45) Date of Patent: Sep. 9, 2014

(54) AUTOMATED CONFERENCING SYSTEM AND METHOD

(71) Applicant: MobileDay, Inc., Boulder, CO (US)

(72) Inventors: James Michael Haid, Boulder, CO (US); Dustin Kane Mallory, Erie, CO (US); Priyan Neomal Guneratne, Sunnyvale, CA (US)

(73) Assignee: MobileDay, Inc., Boulder, CO (US)

( * ) Notice: Subject to any disclaimer, the term of this patent is extended or adjusted under 35 U.S.C. 154(b) by 0 days.

(21) Appl. No.: 14/253,651

(22) Filed: Apr. 15, 2014

Related U.S. Application Data

(63) Continuation of application No. 13/971,566, filed on Aug. 20, 2013.

(60) Provisional application No. 61/691,160, filed on Aug. 20, 2012.

(51) Int. Cl.
*H04M 3/42* (2006.01)
*H04W 4/00* (2009.01)
*H04M 1/64* (2006.01)
*H04M 1/00* (2006.01)
*H04M 3/56* (2006.01)
*H04M 1/725* (2006.01)

(52) U.S. Cl.
CPC .......... *H04M 3/563* (2013.01); *H04M 1/72522* (2013.01)
USPC ....... 455/416; 455/426.1; 370/260; 379/88.1; 379/202.1; 379/354; 379/355.92; 379/355.01

(58) Field of Classification Search
USPC .......... 455/416, 426.1; 379/88.1, 202.1, 354, 379/355.02, 355.01, 88.01; 370/260
See application file for complete search history.

(56) References Cited

U.S. PATENT DOCUMENTS

| 7,835,504 | B1* | 11/2010 | Donald et al. ............. 379/88.11 |
| 7,848,265 | B2* | 12/2010 | Levy et al. .................... 370/260 |
| 2005/0227680 | A1* | 10/2005 | Snowden ...................... 455/416 |
| 2005/0249346 | A1* | 11/2005 | Schnurr ................... 379/355.02 |
| 2007/0121909 | A1* | 5/2007 | Schnurr ................... 379/355.01 |
| 2007/0223674 | A1* | 9/2007 | Skaflestad ................ 379/202.01 |
| 2008/0165944 | A1 | 7/2008 | Rosenthal et al. |
| 2009/0137243 | A1* | 5/2009 | Tsutsumi et al. .......... 455/426.1 |
| 2010/0150330 | A1 | 6/2010 | Perry et al. |
| 2010/0216443 | A1 | 8/2010 | Jacobstein et al. |
| 2011/0135077 | A1 | 6/2011 | Wengrovitz |
| 2011/0142235 | A1 | 6/2011 | Leigh et al. |

* cited by examiner

*Primary Examiner* — Inder Mehra
(74) *Attorney, Agent, or Firm* — Holland & Hart LLP

(57) ABSTRACT

A method of connecting a computing device to a conference. One method comprises finding one or more potential dial-in numbers and looking up the one or more potential dial-in numbers in at least one database. One method further comprises one of, accessing a conference reception zone with one of the potential dial-in numbers when the one of the potential dial-in numbers is found in the at least one database and attempting to access the conference reception zone with the one or more potential dial-in numbers when the one or more potential dial-in numbers are not found in the at least one database. One or more potential conference pin numbers are obtained and it is determined whether one or more additional conference pin numbers are associated with the one or more potential dial-in numbers. A selected conference pin number is assigned a confidence level and the conference pin number is entered in the conference reception zone prior to accessing the conference.

20 Claims, 14 Drawing Sheets

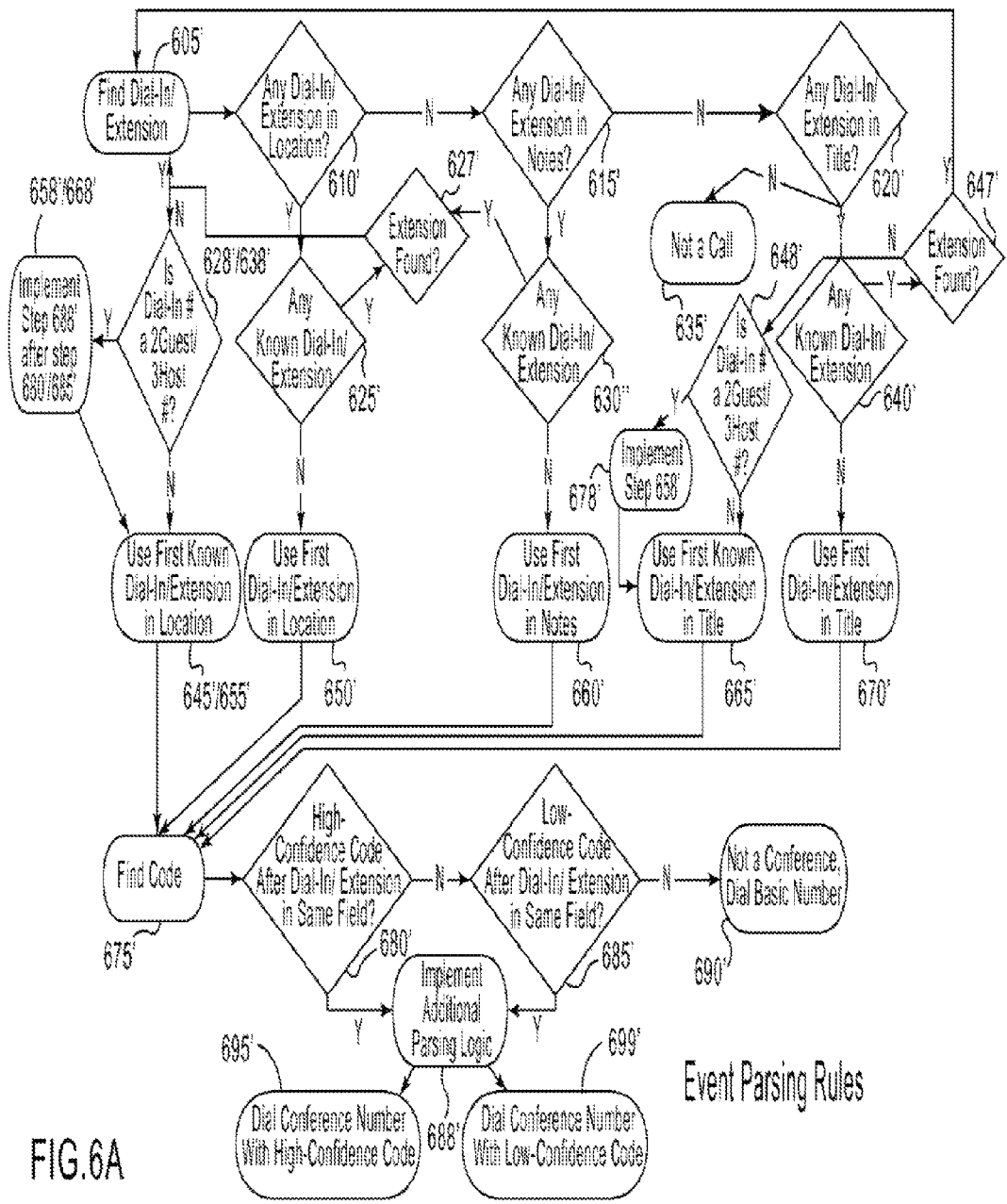
FIG.6A  Event Parsing Rules

AUTOMATED CONFERENCING SYSTEM AND METHOD

CROSS REFERENCES

The present Application for Patent claims priority to, and is a continuation of U.S. patent application Ser. No. 13/971,566 by Haid et al., entitled "Automated Conferencing System and Method," filed Aug. 20, 2013, which claims priority to U.S. Provisional Patent Application No. 61/691,160 by Guneratne et al., entitled "Automated Conferencing System and Method," filed Aug. 20, 2012, and each of which is assigned to the assignee hereof, and expressly incorporated by reference herein.

FIELD OF THE INVENTION

The present invention relates to automated conference calls. In particular, but not by way of limitation, the present invention relates to a device, method, and storage medium to efficiently and effectively connect a conference call participant to a conference call via a computing device.

BACKGROUND OF THE INVENTION

Conference calls are frequently used to communicate ideas to a group of people located in different locations. In order to join a conference call, a person may need to use a communication device to call a phone number, enter one or more passwords (e.g. "codes" or "pins"), and state his or her name prior to joining the call. Therefore, multiple pieces of information may be required to access the call. Entering such information can often be tedious and cumbersome to participants. For example, when traveling, a participant may need to join a conference call during the time that the person is not located at an office and therefore a mobile computing device may be used to access the conference. In such case, the person may also be performing a separate function such as, but not limited to, driving a car or catching a flight. Furthermore, time may be of the essence in connecting to the call. Therefore, a person may not have the ability to access the multiple pieces of information and subsequently enter the multiple pieces of information correctly in order to quickly join the call. Furthermore, if the information is saved or entered incorrectly, obtaining and/or entering the proper information may waste valuable time for the person trying to enter the call as well as the participants waiting for everyone to join and provide input on the topic being covered during the conference call.

SUMMARY OF THE INVENTION

In order to provide an effective and efficient way for persons to enter conference calls from computing devices, a device, system, and method were developed to automatically connect a person to a desired conference at a desired time.

One embodiment of the invention comprises a method of connecting a computing device to a conference. One such method comprises finding one or more potential dial-in numbers and looking up the one or more potential dial-in numbers in at least one database. The method may then comprise using one of the potential dial-in numbers to access a conference reception zone when the one of the potential dial-in numbers is found in the at least one database. Alternatively, when the one or more potential dial-in numbers are not found in the at least one database, the method may comprise, attempting to access the conference reception zone with the one or more potential dial-in numbers. A conference pin number may be obtained and it may be determined whether one or more additional conference pin numbers are associated with the one or more potential dial-in numbers. The method may further comprise assigning the conference pin number a confidence level, entering the conference pin number in the conference reception zone; and accessing the conference.

Another embodiment of the invention comprises a computing device conference connection system. One computing device conference connection systems comprises a computing device comprising one or more features adapted to automatically connect the computing device to a conference call at a conference call start time. The computing device further comprises at least one database comprising a plurality of known dial-in numbers.

Yet another embodiment of the invention comprises a non-transitory, tangible computer-readable storage medium, encoded with processor readable instructions to perform a method of connecting a computing device to a conference. One such method comprises finding a conference dial-in number by at least one of, locating one or more numerical patterns in a calendar event, taking into account a computing device location, and filtering from the dial-in number at least one of, text, one or more symbols, and one or more numbers. The method may further comprise determining if the dial-in number is located in one or more databases, accessing the conference with one of the potential dial-in numbers when the one of the potential dial-in numbers is found in the at least one database, and obtaining a conference pin number. The conference pin number may be obtained by at least one of, locating one or more numerical patterns in a calendar event, taking into account a computing device location, and filtering from the conference pin number at least one of, text, one or more symbols, and one or more numbers. The method may then comprise assigning the conference pin number a confidence level, and joining the conference.

Illustrative embodiments of the present invention that are shown in the drawings are summarized herein. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, where like or similar elements are designated with identical reference numerals throughout the several views and wherein:

FIG. 6A depicts a method of connecting a computing device to a conference according to one embodiment of the invention;

FIGS. 12A-12C depict call edit screens according to one embodiment of the invention.

DETAILED DESCRIPTION

In order to accurately and efficiently enable a conference call participant to join a conference call, a mobile computing device software application may be employed. The term "application" may be used herein to describe processor readable instructions to perform a method which are encoded on a non-transitory, tangible computer-readable storage medium. One such method comprises a method connecting a computing device to a conference. It is contemplated that the term "conference call" may also be referred to throughout the application as a "conference," and vice versa.

Figure 6B:
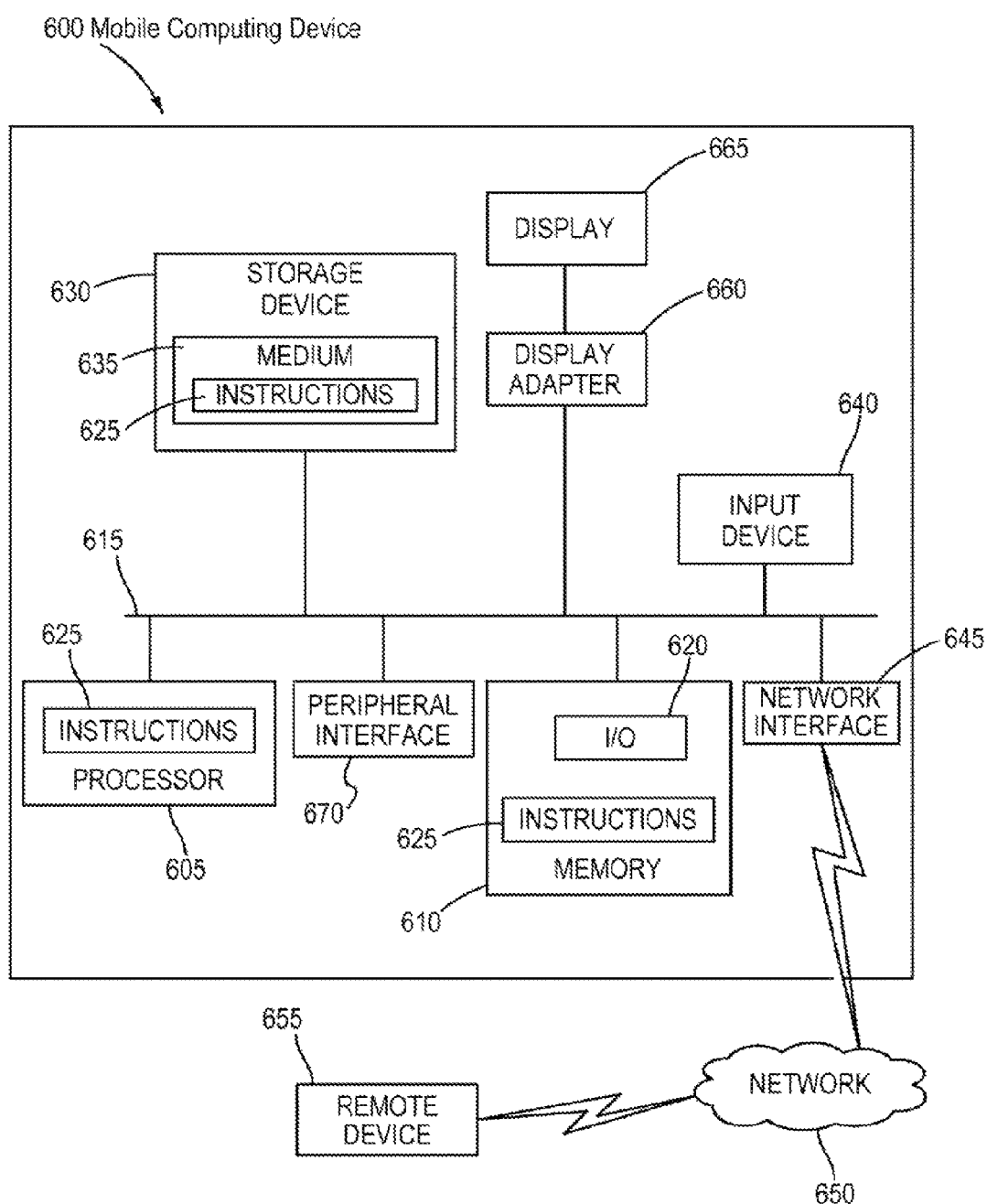
FIG. 6B depicts a computing system according to one embodiment of the invention.

In one embodiment, a user may download an application to a mobile computing device. Seen in FIG. 6B is a block diagram comprising a mobile computing device, described in detail below. Although the term mobile computing device may be used throughout the specification, embodiments of the invention may operate similarly with a desktop computing device or any other computing device type. The application may be stored on a storage device 630 and/or memory 610 and may access one or more pre-existing calendars, contacts and/or location services also stored on the device 600 or remotely stored in order to connect the mobile computing device 600 to a conference call.

Figure 1:
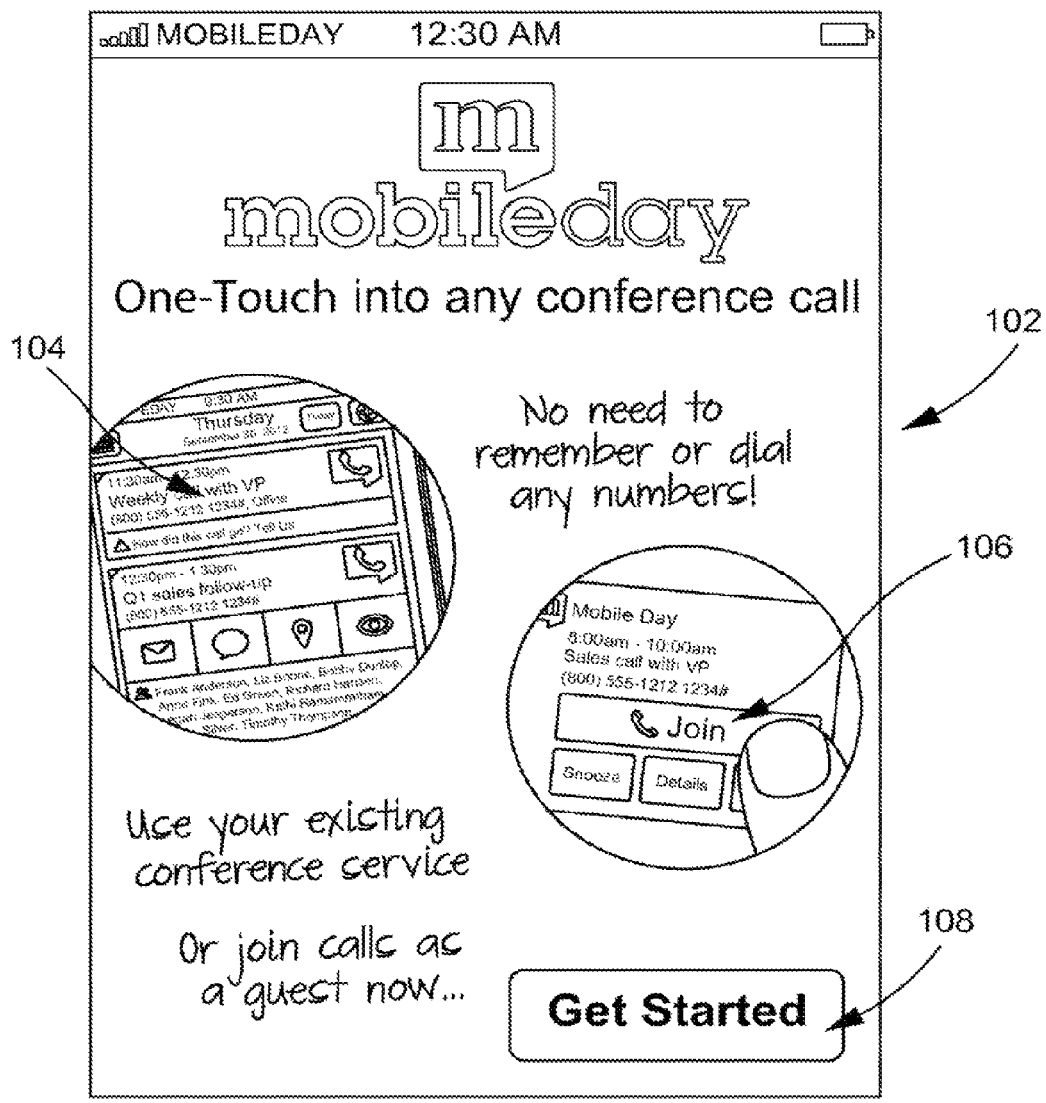
FIG. 1 depicts a launch screen according to one embodiment of the invention.
Figure 7:
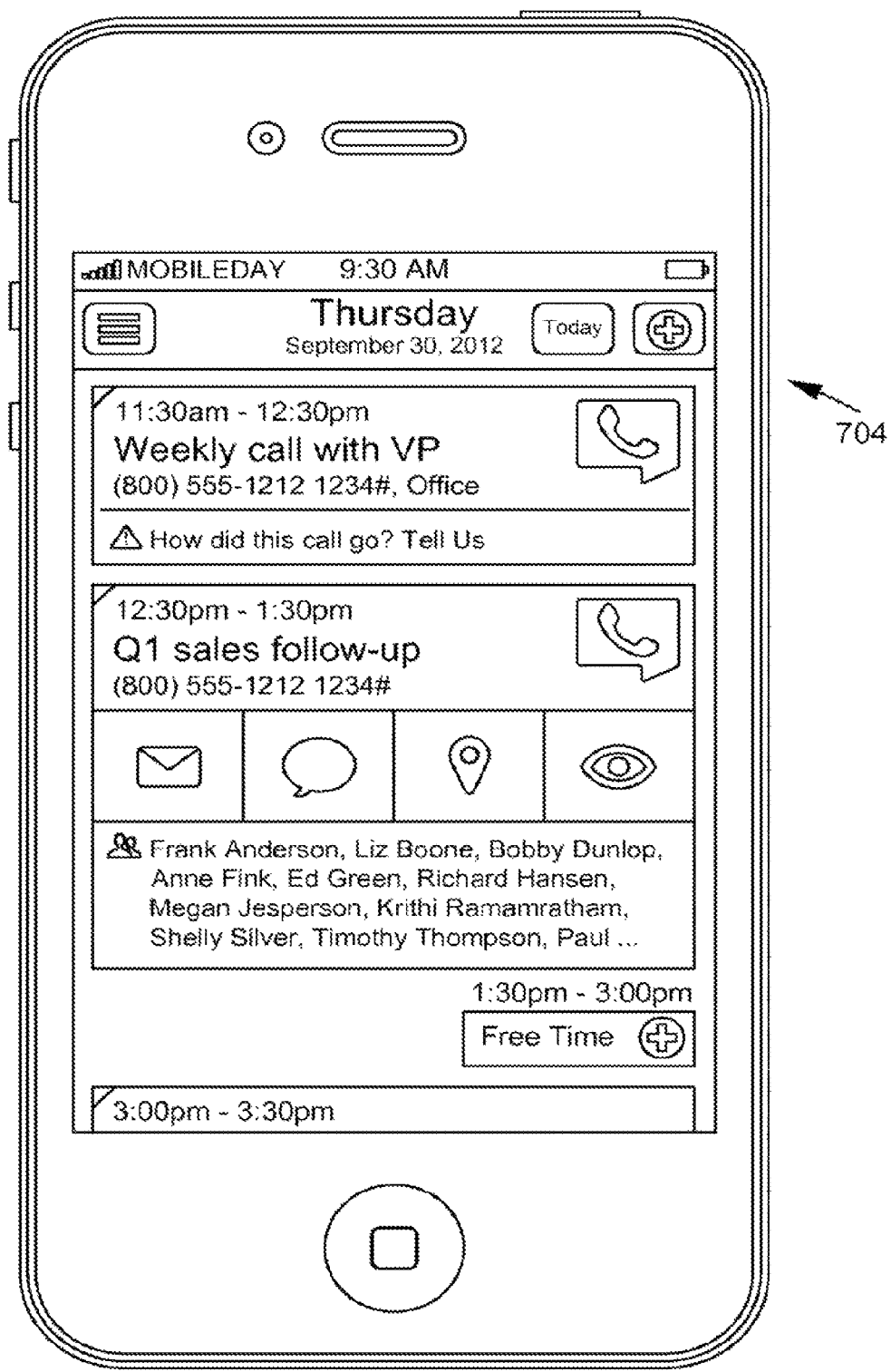
FIG. 7 depicts a user interface according to one embodiment of the invention.

Seen in FIG. 1 is one example of a launch screen 102 for an application comprising a service and/or product that may be employed to connect the mobile computing device 600 to a conference call. As seen in the launch screen 102, one embodiment of the invention may comprise a user interface 104 adapted to display past, on-going, and future conference calls, providing the user with the ability to comment and/or rate the call. FIG. 7 also shows the user interface 704 screen seen in FIG. 1. Call participants may be listed and/or contacted through the user interface 104, 704.

Figure 8:
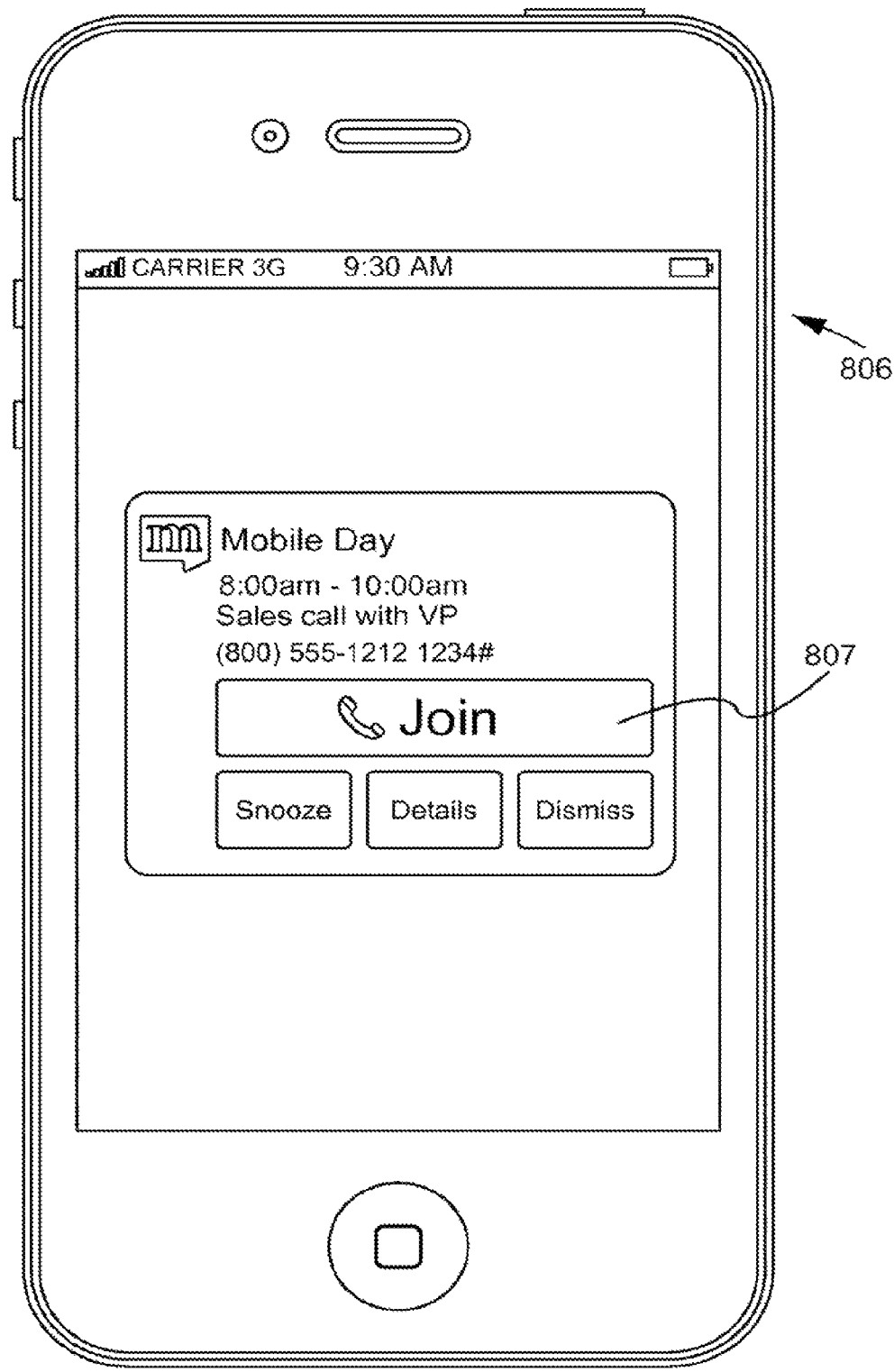
FIG. 8 depicts a conference call screen according to one embodiment of the invention.

Also shown in FIG. 1 is a conference call screen 106 which may either be automatically displayed to a user at a predetermined time or may be manually launched by a user. Notification may also be given for manual dialing as well. FIG. 8 also shows the conference call screen 806. Such a conference call screen 106, 806 may enable a mobile computing device user to join a selected conference call by only clicking a single soft-button on the screen 106 displayed on a computing device touchscreen. For example, a user may be automatically connected to a conference by selecting the "join" button 807 seen in the conference call screen 806 of FIG. 8. Additional buttons may also be pressed. The launch button 108 on the launch screen 102 may enable a user to establish an account and/or use a service on the application such as, but not limited to, the user interface 704 and conference call screen 806.

Figure 2:
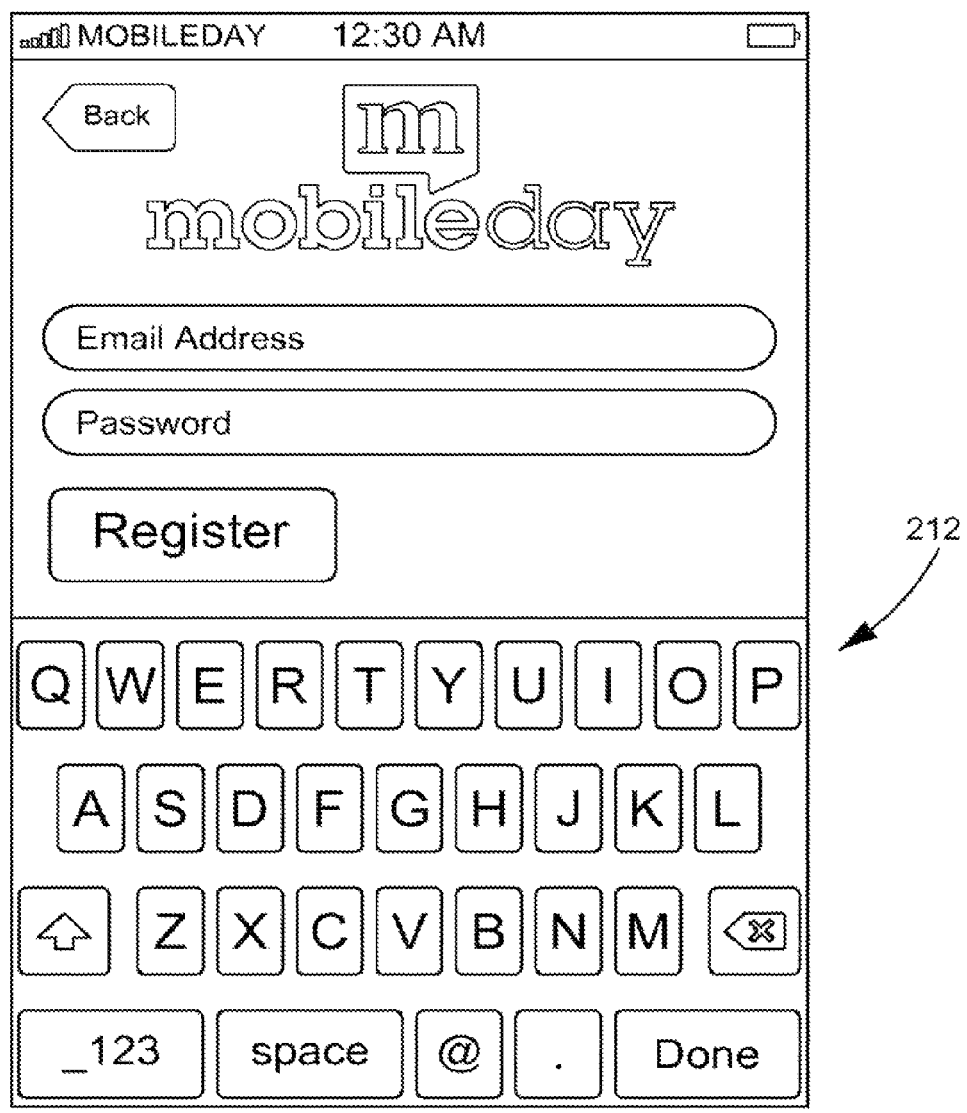
FIG. 2 depicts a registration screen according to one embodiment of the invention.

Seen in FIG. 2 is one example of a registration screen 212 that may be displayed upon selecting the launch button 108 from FIG. 1. One registration screen 212 may be adapted for a user to enter an email address and/or username, and a password. Upon entering this information and selecting the "Register" button, various application features such as, but not limited to, the user interface 104 and conference call screen 106 may be enabled for the user. In one embodiment, the username/password and any other information associated with the application such as, but not limited to, information related to conference calls may be stored locally on the mobile computing device, while in other embodiments at least a portion of the information may be stored on a network/cloud device. In either embodiment, successfully entering a username/email and password may unlock the user interface 104 and conference call screen 106 and enable the features associated therein.

Figure 3:
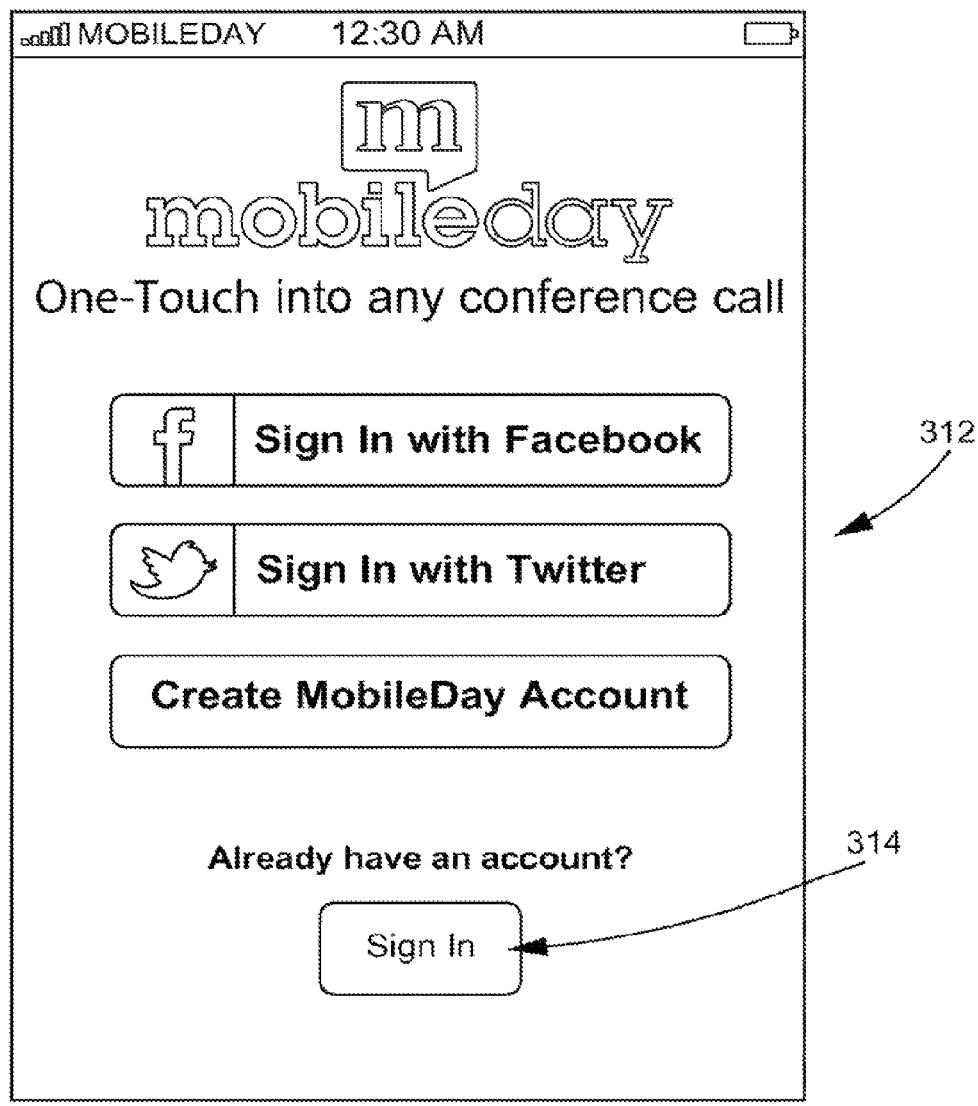
FIG. 3 depicts a registration screen according to one embodiment of the invention.

Seen in FIG. 3 is another example of a registration screen 312 that may be displayed upon selecting the launch button 108 from FIG. 1. As seen, in one embodiment, a user may access the application features upon signing into the application with one or more third-party user names and passwords such as, but not limited to a Facebook® and/or Twitter® username/password. In one embodiment, the registration screen 212 of FIG. 2 may be displayed upon selecting the Sign In button 314 seen in FIG. 3. One application may be accessed by creating an application account, which may be comprised of entering personal information such as, but not limited to, one or more email addresses, a name, a username, and a password. Upon creation of the account, at least one of the registration screens 312, 212 seen in FIGS. 2 and 3 maybe displayed, enabling the user to access the application. A verbal name may also be entered or created based on the entered name, which may be used by the application when accessing conferences.

Upon registering and/or activating an account with the application, and as discussed below, the application may access at least one calendar associated with the mobile computing device 600 in order to locate a conference dial-in number and pin in a calendar entry. To help facilitate this process, the application may receive access one or more known patterns for finding dial-in numbers (i.e., dial-in, dial-ins, number, numbers) and/or guest or host codes (i.e., pins), or a list of known numbers and codes. The known patterns, dial-ins and guest host codes may be located in one or more received databases from a network device. Alternatively, or additionally, known patterns, dial-ins, and codes may be accessed via a cloud connection as calendar entries are parsed to obtain the correct dial-in number(s) and/or host! guest code(s). Furthermore, known patterns, dial-in numbers and/or codes may be loaded onto the device 600 from a network device upon registration/activation. The received patterns, dial-in numbers and codes may be stored on the network device and provided to the application via an API.

In one embodiment, about or up to 1,000,000 dial-in numbers may be received at the mobile computing device via a data file from a network device. Greater or lesser amounts of dial-in numbers and storage space requirements discussed herein for various application features are contemplated. The dial-in numbers may comprise about 10 mb of memory on the network device. In one such embodiment, upon an application being installed and/or an account being activated, a network device may populate a cache with known dial-in numbers in a time of about 10 s or less. The network device may return known dial-in numbers from the cache in about 1 s or less.

On the client side, the client may retrieve the known dial-in numbers and/or codes from the network device in is to about 10 s, depending on the network and/or bandwidth of the connection to the network device. Upon receiving the information, it may take about 2 s or less to save the known dial-ins and/or codes to a local memory 610 and about 1 s or less to load the dial-ins/codes from local memory 610. The dial-in numbers may comprise about 3 mb of compressed data, which may be access via HTTP retrieval. However, other methods known in the art are contemplated as well. Upon un-compression of the data, the dial-in numbers may comprise about 10 mb in local mobile computing device storage 630.

Figure 4:
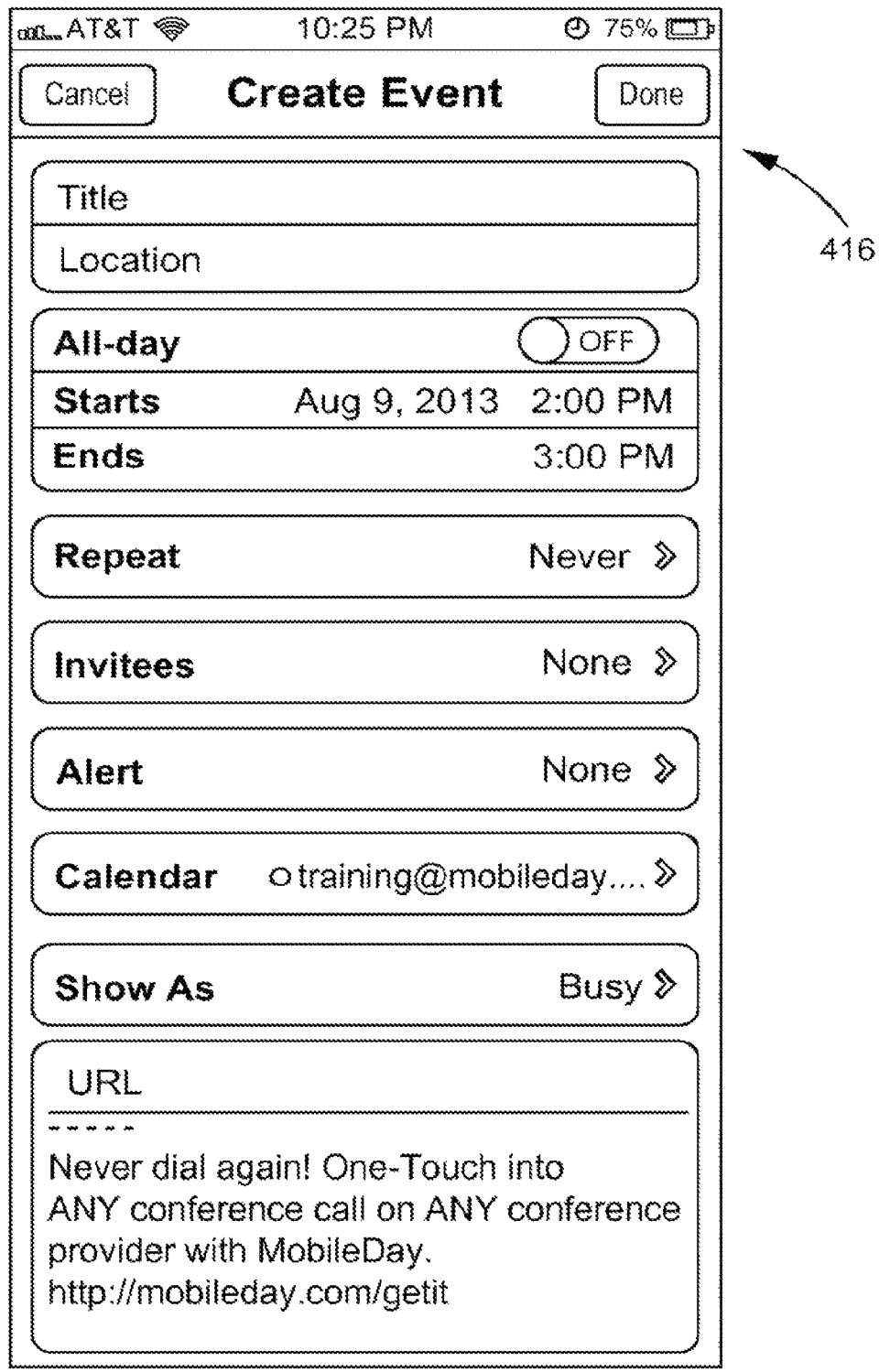
FIG. 4 depicts a create event screen according to one embodiment of the invention.
Figure 5:
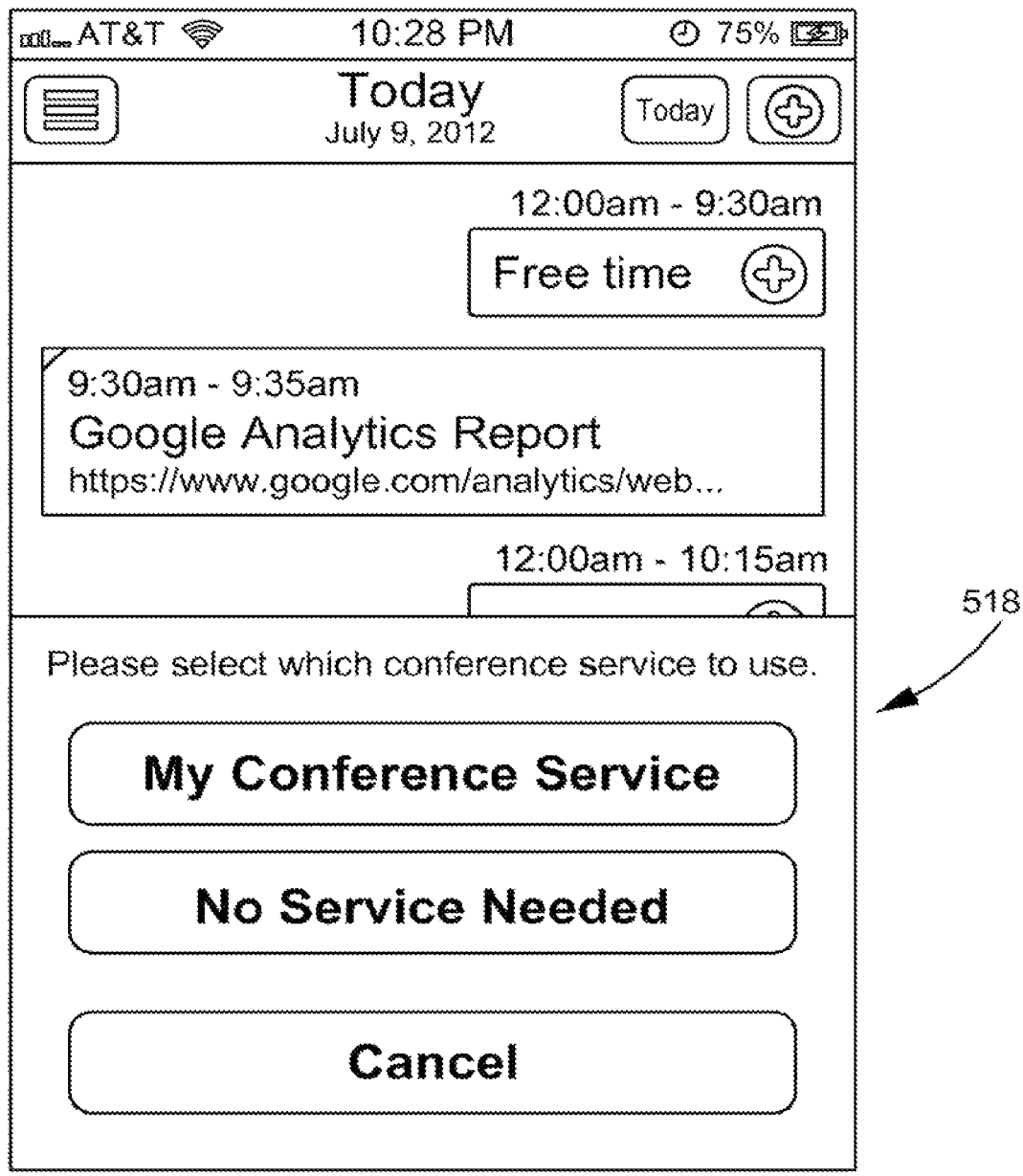
FIG. 5 depicts a conference request screen according to one embodiment of the invention.

Information associated with and/or included within at least one accessed mobile computing device calendars may populate a calendar feature in the application. Such information may comprise conference call information such as, but not limited to, at least one telephone number and pin number associated with the call. Alternatively, a user may manually enter conference call information into the application. For example, the create event screen 416 seen in FIG. 4 may enable a user to enter conference call information into the application. One or more screens may also enable One such create event screen 416 may enable the user to identify the user as a conference host or the organizer of the meeting. Other screens may also, or in the alternative, provide such enablement, or enablement described with reference to any other screen. For example, the screens shown in FIGS. 9-11 may be used to identify a user as a guest or a host. Such screens may be automatically populated with information found form parsing the calendar entries, upon looking up the found information in the database(s), and determining if the dial-in number/codes are guest or host number/codes. A user may also manually enter host account information in order to enable the application to automatically detect when the user is the host of any meeting in any calendar, and thus dial the user into the meeting as the host instead as a guest. For some conferences, connecting a user as a host may require a different connecting sequence/information than if the user were to be connected as a guest.

Figure 9:
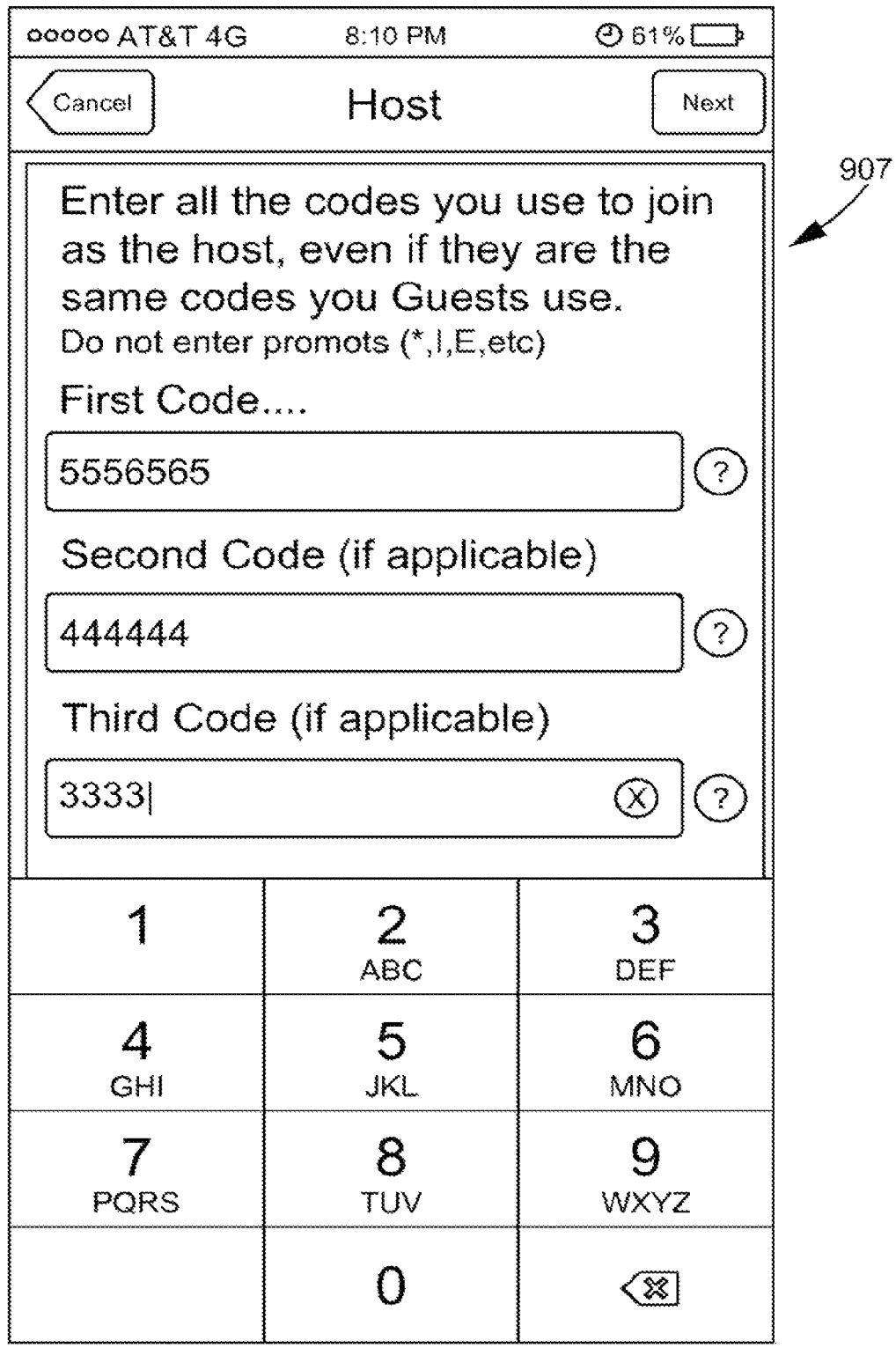
FIG. 9 depicts a host screen according to one embodiment of the invention.
Figure 10:
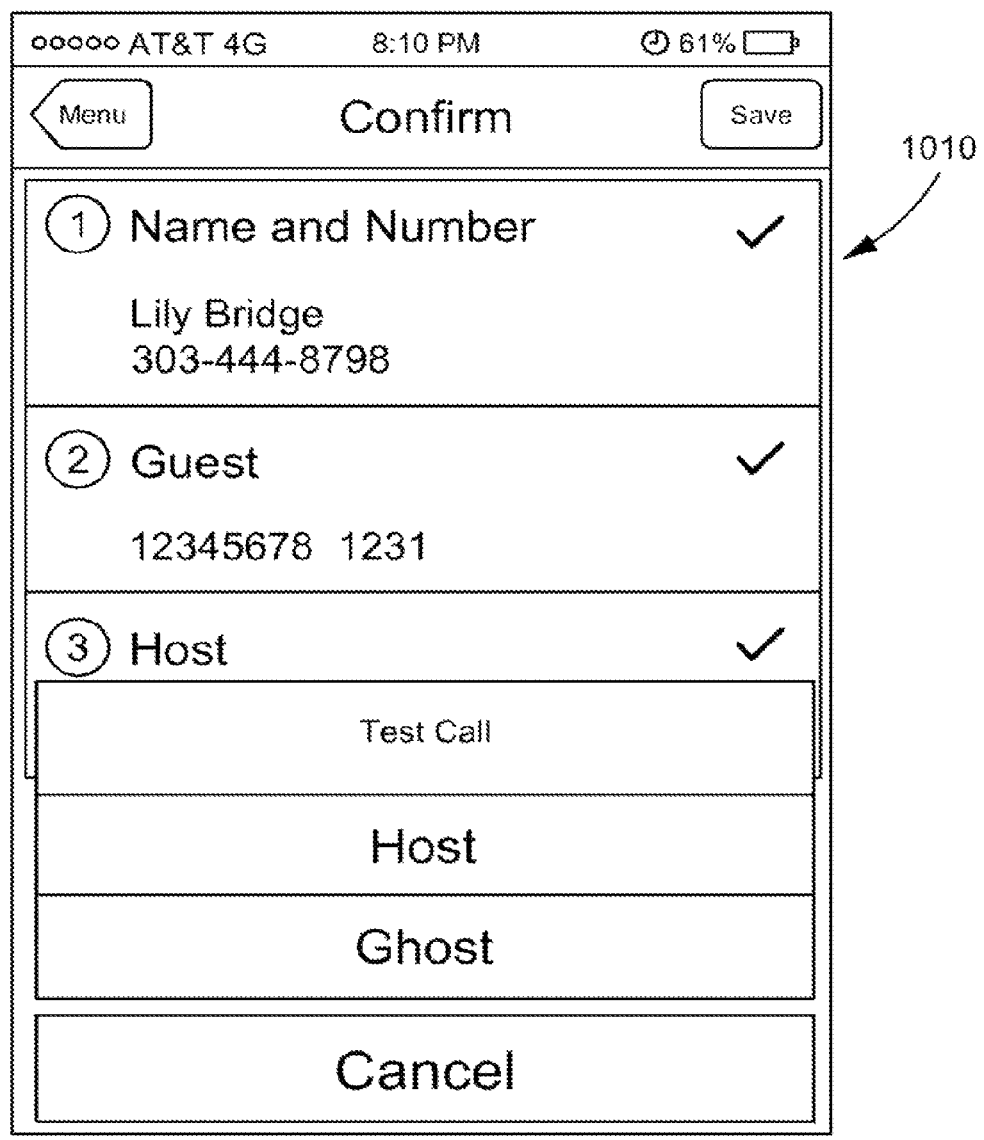
FIG. 10 depicts a confirmation screen according to one embodiment of the invention.
Figure 11:
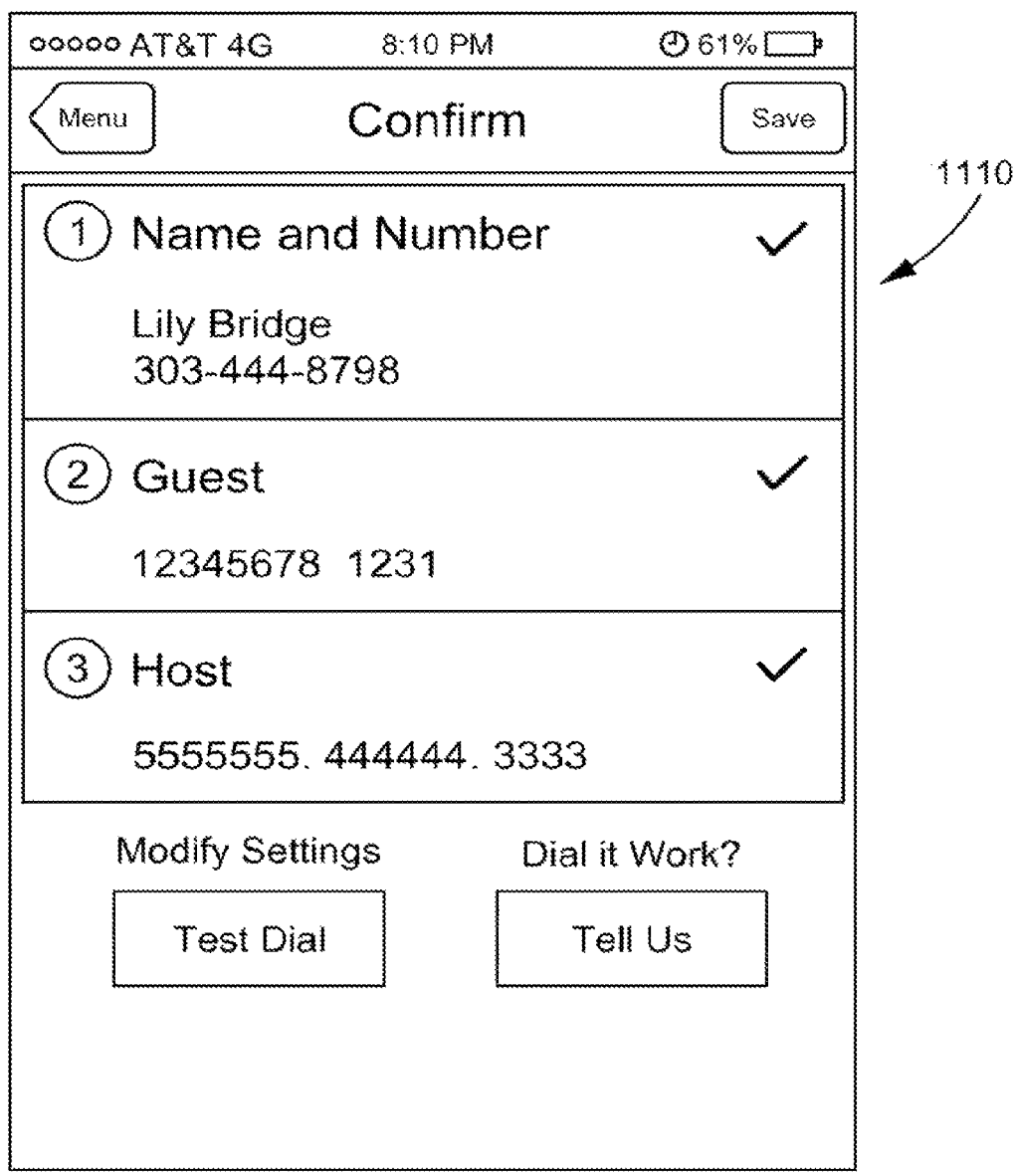
FIG. 11 depicts a confirmation screen according to one embodiment of the invention.

Seen in FIG. 9 is one example of a host screen 907 which may comprise one or more pin numbers to enter in order to be recognized as the conference host. Furthermore, FIG. 10 shows a confirmation screen 1010 which enables a user to identify if the user should be dialed into an identified conference/phone number as a guest or a host and allowing the user to enter the codes to connect to the conference as each type of participant. FIG. 11 also shows the confirmation screen 1110 in a verification mode. Subsequently, when the meeting/conference is identified in the calendar as a guest or a host conference/meeting, the application will use the number(s) in the proper guest/host section of the confirmation screen 1010 or host screen 907 to connect the user to the conference as the proper participant type. It is contemplated that the host dial-in number(s) and/or codes/pin number(s) may be different than, or the same as, the guest dial-in/pin numbers. In one embodiment, the application may automatically recognize a found dial-in number/code as a guest or host number/pin upon accessing the one or more databases described below with reference to FIG. 6A, and may therefore automatically connect the user to the conference as the recognized host or guest.

In one embodiment, upon accessing a mobile computing device calendar, and/or host screen 907 populating an application calendar feature, a Conference Request Screen 518 may be displayed. In one embodiment, the Conference Request Screen 518 may be adapted to enable a user to associate an effective and efficient conference call connection service with each particular conference call. If the user chooses to use a conference call connection service feature for the conference call, the application will automatically establish a connection with the conference call at the appropriate time listed in the calendar.

Figures 12A, 12B, 12C:
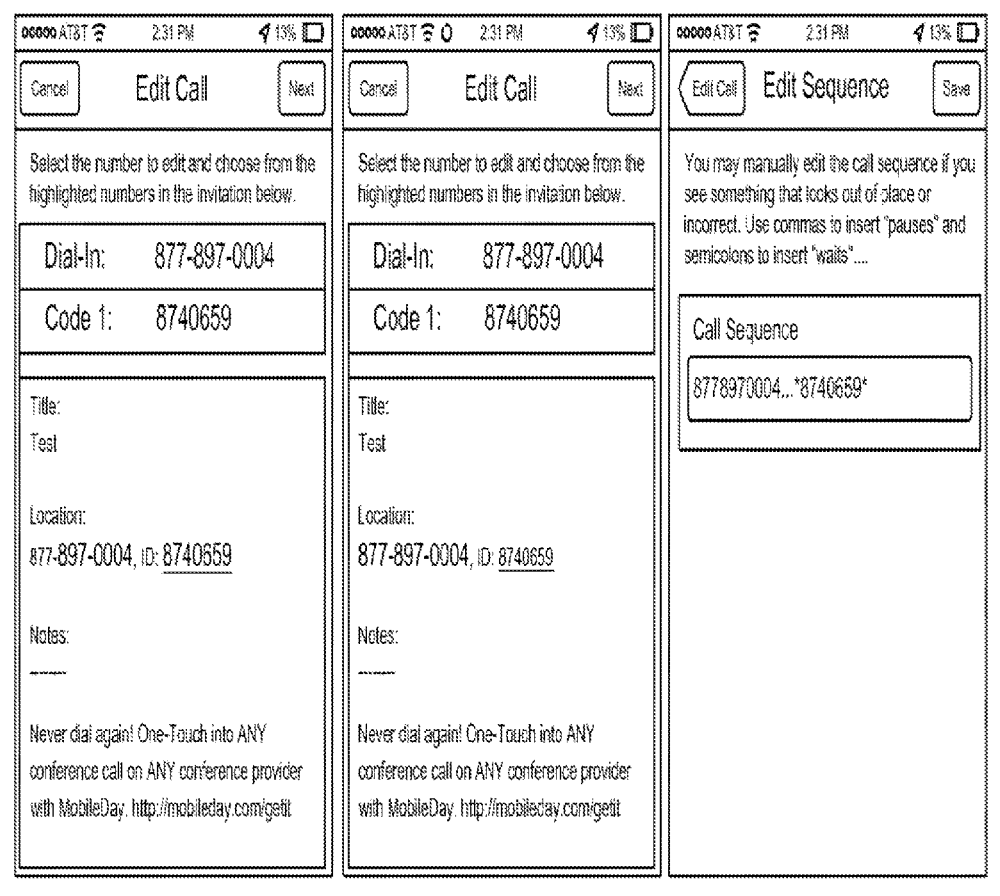

Upon establishing an event with the application, either through the create event screen 416 or through any other method such as, but not limited to, at least a portion of the method described with reference to FIG. 6A adapted to automatically enter information to dial, a user may implement one or more of the call edit screens seen in FIGS. 12A, 12B and 12C to manually edit the call information.

Figure 13:
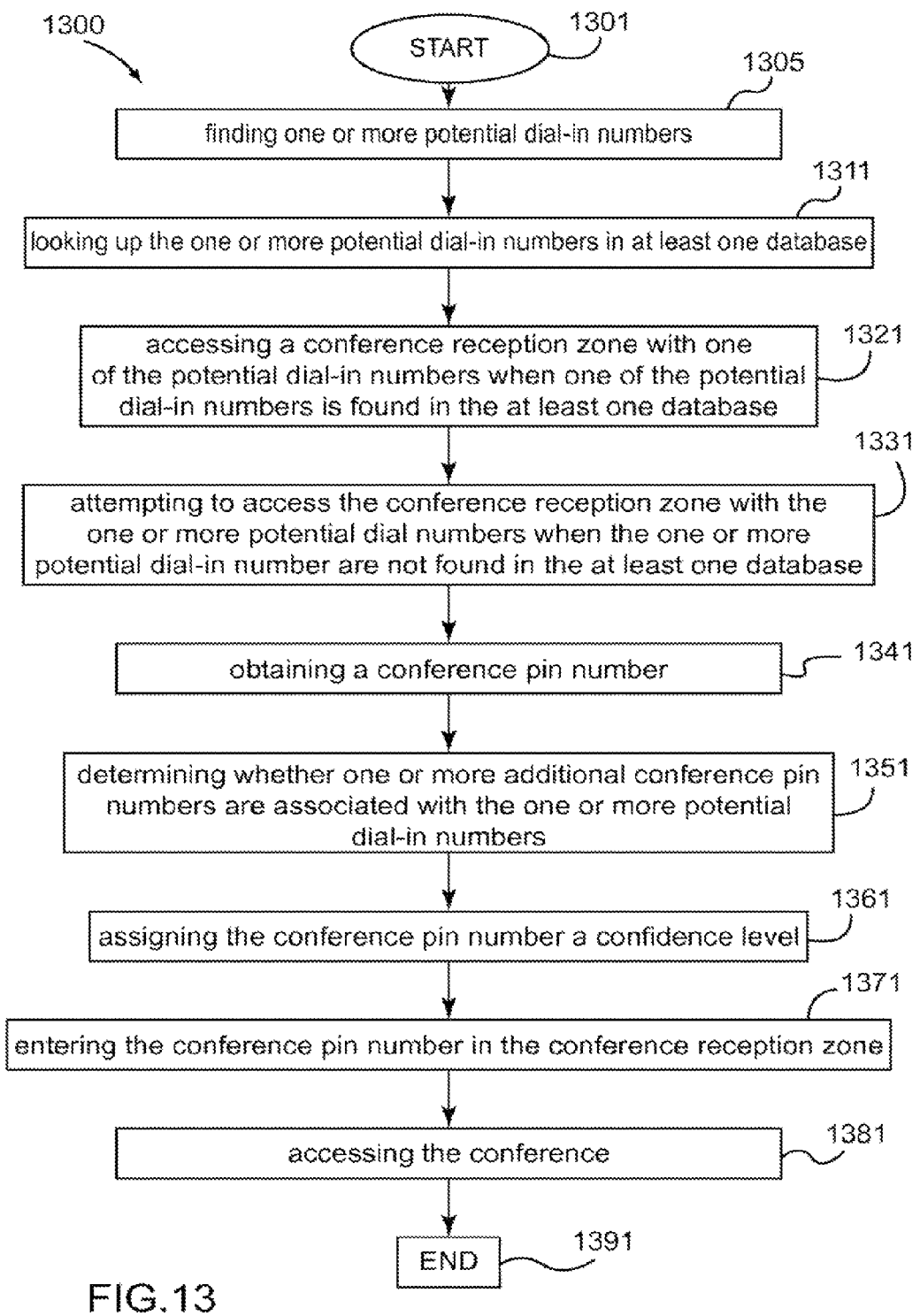
FIG. 13 depicts a method of connecting a computing device to a conference according to one embodiment of the invention.

Turning now to FIG. 13, with reference to FIG. 6A, seen is one embodiment of a method 1300, 600' of connecting a computing device to a conference call. The method 1300 starts at 1301 and at 1305 and 605', one method 600' may comprise finding one or more potential dial-in numbers associated with the number. For example, an application may be adapted to locate a dial-in number in a mobile computing device calendar in a third-party computing application such as, but not limited to, an email application. Dial-in numbers may be sought in other locations as well (email subject/body, etc.). Although various elements in FIG. 6B are identified as a "dial-in/extension" step, as described elsewhere, each step handles the "dial-in" portion of each step prior to handling the "extension" portion of the step. It is only after a dial-in number is found, for example, in at least one of steps 610', 615' and 620', and then subsequently located in a known-dial-in number database, in at least one of steps 625', 630" and 640', that the dial-in number found in the database is searched for an extension, at steps 627 and 647. If a the known dial-in number in the database lists an extension as being associated with the dial-in number, then the Y route is taken from steps 627 and 647 back to step 605', but with step 605', and any subsequent steps, being applied for the extension instead of the dial-in number, where appropriate. If the dial-in number is not identified in the database as having an extension associated with the dial-in, then the process proceed to 628, 638, and 648 and no extension is sought in the calendar entry.

Throughout the specification and claims there are references to one or more dial-in numbers, extensions and/or pins. It is contemplated that upon determining the final combination of a dial-in number/extension/pin, a known conference sequence is obtained. Such a sequence may also include additional information such as one or more symbols. For example, the sequence may comprise a #-sign or symbols adapted to produce a delay in the calling sequence, which may be determined by the calendar entry, the location of the caller, or a database entry. Therefore, upon obtaining the final dial-in number, extension, and pin information, the dial-in sequence is also obtained.

Various strategies (i.e., parsing logic) may be used to find the dial-in/extension. In one embodiment, the application may be adapted to find numerical patterns in an application feature such as, but not limited to a calendar event. One such embodiment may comprise finding one or more patterns in a phone number prefix or a suffix located in the calendar event. The physical location of the mobile computing device may be determined and taken into account when attempting to find the correct dial-in number. Furthermore, various symbols, text, and/or numbers may be filtered from the calendar event in order to obtain the proper dial-in number and/or extension. For example, dashes and commas may be removed, as might a leading zero or one if a string of digits is found that is longer than ten numbers. When a user is located in a location requiring special dialing rules, the location of the user may be used to implement a local dialing number. For example, if a user is located in Canada, the dial-in number may be identified as a Canadian number. In one such embodiment, a Canadian number may require a "one" to be inserted before a 10-digit dial-in number, and the application will ensure the dial-in number contains the "one" in the proper location. When in other locations, upon searching the at least one database, and as described below, only numbers identified as numbers available for that location may be searched. Furthermore, special rules may be implemented such as, but not limited to, a search for special specific prefixes, etc.

Use of delimiters and NPA/NXX rules may also be employed to obtain the correct dial-in number (and pin). It is contemplated that throughout the application, where a description is given on a feature adapted to find a dial-in number in a calendar event, such a feature may also be applied to find an extension or a pin number in a calendar event, and vice versa. NPA is the acronym for Numbering Plan Area Code, while NXX is the acronym for Central Office (exchange) Code. A typical ten-digit U.S. phone number may therefore comprise the format NPA-NXX-xxxx. One embodiment of the invention may comprise a database having about 500,000 valid NPA/NXX rules/prefixes for known dial-in conference numbers. The number of rules/prefixes may be larger when additional locations/countries are taken into account. This database may comprise about 2.6 mb of compressed data and may be bundled with the application installation. The NPA/NXX prefixes may comprise about 13.8 mb of storage after being uncompressed.

The application may also have the ability to access a list of known dial-in numbers and extensions. Such a list may be located in at least one received and/or on-line database. As seen at 1311, one method 1300 may comprise looking up the one or more potential found dial-in numbers in the at least one database. The found numbers may be compared to the database. Looking at FIG. 6A, upon automatically locating or manually identifying a calendar event in the application, the location, notes, and title (i.e., subject) associated with the calendar event may be searched for a dial in number and extension associated with the number. As seen in step 610' of the method 600', it is determined whether a dial-in/extension is located in the calendar location field. If no dial-in number/extension is found in the location field, then the method 600' moves to step 615', which determines if a dial-in number/extension is located in the notes section of the calendar entry. If no dial-in/extension is found in the notes, the dial-in/extension is sought in the title of the calendar entry at 620'. If no dial-in/extension is found in steps 605'-620', then at 635', the application may determine that the calendar entry fails to include any conference call information. In such a case, a notation may be associated with the calendar entry identifying the entry as not a conference call entry. At steps 610', 615', and 620', upon finding a dial-in number in at least one of the location, notes and title, respectively, the location, notes and title may be searched to determine whether an extension can also be found.

At steps 625', 630', and 640', upon finding a dial-in number in at least one of the location, notes and title, respectively, it is then determined whether the dial-in number is located in at least one of, at least one database associated with the application on the mobile computing device and at least one database located on one or more network/cloud devices. It may take about 1 ms or less to look up a found dial-in number against the known dial-in numbers in the database. If an extension number was also found in the at least one of the location, notes, and title, then an extension number may also be sought in the at least one database.

If a dial-in number/extension is found in the at least one database at steps 625', 630" and/or 640', steps 628, 638, and 648 may be invoked, respectively. At steps 628, 638, and 648, it is determined whether the found dial-in number/extension comprises a dial-in number or extension that requires one or more additional pin numbers. For example, a conference participant (i.e., a "guest") may need to enter two (or more) codes/pins to enter the conference, or a host may need to enter to enter three (or more) codes/pins. Such a conference dial-in number/pin may be referred within the specification herein as a 2 Guest/3 Host scenario. If the number is not identified as a 2 Guest/3 Host scenario in a database, or if the application does not otherwise identify the number as a 2 Guest/3 Host scenario, then the process moves towards steps 645', 655', and 665', respectively. If the number is identified as a 2 Guest/3 Host scenario in a database, then one of steps 658, 668, and 678 (respectively) is implemented. As seen in step 658, under a 2 Guest/3 Host scenario, step 688 is implemented after steps 680' and 685' if the "Y" path is followed. In step 688, additional parsing of the calendar or other applications is performed to find any additional codes, similar to the parsing performed with reference to steps 605', 610', 615', and 620'. In looking at step 688, when the dial-in number is determined to be a host dial-in number which requires three codes to be entered by the host, and the dial-in number/codes are identified in the at least one database or in the application as requiring static codes/pins (i.e. do not change between meetings), parsing logic implemented at step 688 may attempt to obtain all three codes/pins from the host screen 907 seen in FIG. 9 and/or the application/calendar invitation from which the conference was set up form in steps 605', 610', 615', and 620'.

Often, in searching a calendar entry, multiple telephone numbers are found. The parsing logic described above is used to determine which, if any, of the numbers are potential dial-in numbers. At steps 645', 655', and 665', if one of the potential dial-in numbers is found in at least one of the databases, the found dial-in number/extension is identified as a first valid dial-in number/extension and the application dials the number and attempts to join the conference. At 1321, this is identified as accessing a conference "reception zone" with one of the potential dial-in numbers when the number is found in a database. Such a "reception zone" is identified as a conference dial-in location prior to entering the access code/pin. At steps 650', 660', and 670', if a dial-in number/extension is not found in at least one of the databases, the application uses the first dial-in number/extension found in each of the location, notes, and title, respectively, in an attempt to access the conference. For example, and as seen at step 1331 in FIG. 13, the conference reception zone is attempted to be accessed with the one or more potential dial-in numbers when the one or more numbers are not found in a database. If multiple dial-ins/extensions are found in the calendar entry, the application may use the dial-in/extension found in the database, though the first number/extension listed in the calendar entry and identified as a dial-in number through the parsing logic will be used for an attempted conference connection if no number is found in a database. When accessing a conference, it is contemplated that the application may initiate a computing device dialer or VOIP dialer to dial the dial-in number.

Upon determining which dial-in number/extension to use, at step 675' of FIG. 6B, a guest or host code is sought. This is seen in FIG. 13 as obtaining a conference pin number at step 1341. The conference pin number or password may also be referred to as a guest or host code. At 1351 is the step of determining whether one or more additional conference pin numbers are associated with the one or more potential dial-in numbers. Such a step may include the 2 Guest/3 Host scenario described above. Parsing strategies to find one or more pin numbers/codes may be similar to the parsing strategies implemented to find the dial-in number, and vice versa. For example, code/pin number parsing strategies may comprise determining whether one or more of a number prefix, suffix, delimiter, and length are associated with a rule for finding a dial-in number/extension/pin. Such a rule may comprise finding patterns in one or more of the number prefix, suffix and delimiter to obtain the pin. In one embodiment, a pattern in a length of a prefix, suffix and delimiter may also be determined. Alternatively, parsing strategies based on proximity to a valid dial-in number may be implemented. For example, the application may be adapted to locate a host code (or even a dial-in number) by identifying numerical entries placed in the calendar event near an identified symbol, letter, or phrase. In one such embodiment, the application may be adapted to locate a numerical entry preceded or followed by one of the following: x, code, /, #, No. Other terms, phrases and symbols are contemplated. Furthermore, if one or more symbols, letters, or phrases are located in one or more portions of the calendar entry, a numerical entry associated with a symbol, letter, or phrase nearest a selected dial-in number may be first used as a pin in an attempt to access the conference. Such numerical entries located near identified symbols, letters, or phrases which are subsequently also found and in a database may be identified as a "high confidence" conference pin number. Numerical entries found in the calendar event which are not subsequently found in the database may be identified as a low confidence conference pin number. Other levels of confidence are contemplated. At step 1361, a pin number is assigned a confidence level.

In one embodiment in searching the calendar entry, a first numerical/textual/symbolic pattern that is found may comprise a dial-in number and a second of a found numerical/textual/symbolic pattern may comprise a pin number. Furthermore, it is contemplated that although the term "one or more potential dial-in numbers" are used herein, upon locating one of the numbers in a database, only the found number may be used.

At 680', if a code is found in the same field (e.g., title, location, notes) as the dial-in number, the code may be identified as mid-level confidence pin number. Other factors may also affect the confidence rating-location, proximity, etc. Only pin numbers also found in the database may be assigned the highest confidence level. When a pin number is assigned a lowest confidence level (due to being located at a distant proximity from the found dial-in number, or being located in a different calendar entry section), such a pin number may not be automatically entered by the application at the conference reception zone. In such an embodiment, upon reaching the zone, a user may be required to manually enter the pin number. Confidence level is helpful to identify which pin number to use when attempting to access the conference at the reception zone when multiple access codes are found in a calendar entry.

At 695', the dial-in number is dialed and a found high confidence access code is automatically entered. As seen at step 685', a code determined not to be a high-confidence code is found and at 699', the dial-in number is dialed and the low-confidence code is entered manually. Step 688 described above to obtain additional access codes for a 2 Guest/3 Host scenario may also be performed. In turning again to FIG. 13, at step 1371, the conference pin number may be entered in the conference reception zone and at 1381 the conference may be accessed. The method ends at 1391. Confidence levels may also be assigned to a dial-in number or pin number/code may be based on other factors such as, but not limited to, (a) known (previously identified/used) numbers, (b) proximity to one or more key words/numbers/symbols, (c) proximity to other conference call information such as, but not limited to, a pin number that is within one line of a found dial-in number, and (d) the number of digits in the dial-in number/code. The number of confidence levels may vary, for example, depending on the number of factors taken into account to determine the confidence level, which may vary as well. At 690', if no code is found with either the high-confidence or low-confidence method, the phone number is determined not to be a conference dial-in, and may be assigned as a regular phone number in a central and/or a local database. Other categories may be given to the number such as, but not limited to, a "not in service" number, an operator assisted conference number, and a fax number. By such identification of found phone numbers as non-dial-in numbers and then distributing the identified numbers as not a dial-in number, the numbers of false-positive dial-in numbers are decreased. In this regard, found phone numbers identified as potential dial-in numbers in FIG. 6A are compared to the database of numbers identified as not conference dial-in numbers. Furthermore, found numbers are added to such a database, based on location (e.g. a signature) in the calendar event, etc.

Updates to known dial-in numbers do not required an application update. For example, if a dial-in number is identified as a valid conference call phone number in a central database, the mobile device may be notified of the update on a daily basis.

If a user is disconnected from a conference prior to the end of the conference, the user may be automatically reconnected to the call. For example, if the calendar entry states that the call will last for 1 hour and the call is disconnected after 20 minutes, the application may automatically rejoin the user to the call. Alternatively, a user may manually rejoin the conference. Furthermore, if a user wishes to disconnect from a conference prior to the conference end time, the user may choose not to rejoin the conference. A user may join and rejoin a conference at any time and multiple number of times.

It is contemplated that the network device may provide updates to the application related to dial-in patterns, code patterns, or known dial-in numbers. The network device may provide updates via one or more new application versions comprising new rules and/or priorities regarding how patterns and known dial-in numbers are implemented by the application to find and/or validate codes and dial-in numbers. Additional event data may also be used in updates or otherwise to make decisions regarding the dial-in numbers and/or codes. Updates may further include modification of the NPA/NXX prefixes. The information on the network device and/or mobile computing device may be stored in a database format.

In addition to the above embodiments disclosing automatically connecting a user to a conference call comprising a teleconference (i.e., voice), one embodiment of the invention may also comprise automatically connecting a user to a data conference. One type of data conference may comprise a Voice-over-Internet-Protocol, or a VoIP call. Other data conferencing embodiments may comprise video-conferencing or data-sharing conferences. One type of data-sharing conference may comprise file sharing such as, but not limited to, sharing of one or more presentation materials or documents.

In one embodiment, the application may parse calendar invites or other information to recognize video conference call formats such as, but not limited to, Skype® or FaceTime® call formats. If a format is recognized, a user is presented with the recognized join icon (e.g. Skype of FaceTime) for that particular meeting. If a user chooses to join the meeting, the corresponding application will be automatically opened, the information found in the calendar invite will be inserted into the application, and the user will be connected through the application.

Specific URLs may also be identified as a dial-in number for on-line meetings, which then be placed in the dial-in number location within the application in a manner similar to the ten-digit number described with reference to FIG. 6A. On-line meetings such as, but not limited to, Webex®, GoToMeeting®, and Google Hangouts® may be connected under this option. However, other on-line meetings and services may be supported. If a user chooses to join an online meeting, the application will trigger the corresponding online application such as Webex® to be opened automatically and will automatically insert the found codes and dial-in information into the application in order to automatically join the meeting, so long as the application is already installed on the computing device. It is to be appreciated that not all URLs will be considered as an address for an online meeting, with non-address false-positive URLs being filtered out by the system. One way to filter out URLs is to ensure that the URL contains a minimum set of information before it is considered to be an online meeting URL.

It is contemplated that any aspect of a data conference or multiple aspects of a data conference may be employed substantially simultaneously as a voice conference. For example, a user may employ a file sharing application during a phone conference. One file sharing application may enable one or more users to modify the file selected for sharing.

When a data conference is involved, in one embodiment, a data connection to a network server may be established. For example, a network server may receive requests to join a data portion of a conference from one or more users and subsequently provide the information shared between the users. Substantially simultaneously, a teleconference may occur through a network other than the data network. Or, the teleconference may also occur through the data network via a VoIP teleconference.

FIG. 6B below shows a diagrammatic representation of one embodiment of a machine in the exemplary form of a computer system 600 within which a set of instructions for causing a device to perform anyone or more of the aspects and/or methodologies of the present disclosure to be executed. The elements identified by the reference numerals associated with FIG. 6B are different from the elements identified by the reference numerals associated with FIG. 6A and are differentiated from the FIG. 6A elements by FIG. 6A using a prime value ("'") with each of the reference numerals, and FIG. 6B not using a prime value.

In FIG. 6B, Computer system 600 includes a processor 605 and a memory 610 that communicate with each other, and with other components, via a bus 615. Bus 615 may include any of several types of bus structures including, but not limited to, a memory bus, a memory controller, a peripheral bus, a local bus, and any combinations thereof, using any of a variety of bus architectures.

Memory 610 may include various components (e.g., machine readable media) including, but not limited to, a random access memory component (e.g., a static RAM "SRAM", a dynamic RAM "DRAM," etc.), a read only component, and any combinations thereof. In one example, a basic input/output system 620 (BIOS), including basic routines that help to transfer information between elements within computer system 600, such as during start-up, may be stored in memory 610. Memory 610 may also include (e.g., stored on one or more machine-readable media) instructions (e.g., software) 625 embodying anyone or more of the aspects and/or methodologies of the present disclosure. In another example, memory 610 may further include any number of program modules including, but not limited to, an operating system, one or more application programs, other program modules, program data, and any combinations thereof.

Computer system 600 may also include a storage device 630. Examples of a storage device (e.g., storage device 630) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD, etc.), a solid-state memory device, and any combinations thereof. Storage device 630 may be connected to bus 615 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 630 may be removably interfaced with computer system 600 (e.g., via an external port connector (not shown)). Particularly, storage device 630 and an associated machine-readable medium 635 may provide nonvolatile and/or volatile storage of machine-readable instructions, data structures, program modules, and/or other data for computer system 600. In one example, software 625 may reside, completely or partially, within machine-readable medium 635. In another example, software 625 may reside, completely or partially, within processor 605. Computer system 600 may also include an input device 640. In one example, a user of computer system 600 may enter commands and/or other information into computer system 600 via input device 640. Examples of an input device 640 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 640 may be interfaced to bus 615 via any of a variety of interfaces (not shown) including, but not limited to, a serial interface, a parallel interface, a game port, a USB interface, a FIREWIRE interface, a direct interface to bus 615, and any combinations thereof.

A user may also input commands and/or other information to computer system 600 via storage device 630 (e.g., a removable disk drive, a flash drive, etc.) and/or a network interface device 645. A network interface device, such as network interface device 645 may be utilized for connecting computer system 600 to one or more of a variety of networks, such as network 650, and one or more remote devices 655 connected thereto. Examples of a network interface device include, but are not limited to, a network interface card, a modem, and any combination thereof. Examples of a network or network segment include, but are not limited to, a wide area network (e.g., the Internet, an enterprise network), a local area network (e.g., a network associated with an office, a building, a campus or other relatively small geographic space), a telephone network, a direct connection between two computing devices, and any combinations thereof. A network, such as network 650, may employ a wired and/or a wireless mode of communication. In general, any network topology may be used. Information (e.g., data, software 625, etc.) may be communicated to and/or from computer system 600 via network interface device 645.

Computer system 600 may further include a video display adapter 660 for communicating a displayable image to a display device, such as display device 665. A display device may be utilized to display the various screens discussed above with reference to the figures. Examples of a display device include, but are not limited to, a liquid crystal display (LCD), a cathode ray tube (CRT), a plasma display, and any combinations thereof. In addition to a display device, a computer system 600 may include one or more other peripheral output devices including, but not limited to, an audio speaker, a printer, and any combinations thereof. Such peripheral output devices may be connected to bus 615 via a peripheral interface 670. Examples of a peripheral interface include, but are not limited to, a serial port, a USB connection, a FIREWIRE connection, a parallel connection, and any combinations thereof. In one example an audio device may provide audio related to data of computer system 600 (e.g., data representing an indicator related to joining and/or disconnecting from a conference).

A digitizer (not shown) and an accompanying stylus, if needed, may be included in order to digitally capture freehand input. A pen digitizer may be separately configured or coextensive with a display area of display device 665. Accordingly, a digitizer may be integrated with display device 665, or may exist as a separate device overlaying or otherwise appended to display device 665.

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method to facilitate conference calling from a mobile device, the method comprising:
   locating, automatically with a first application on the mobile device, a potential dial-in number from a second application on the mobile device;
   obtaining, at the mobile device and before receiving input from a user, a conference sequence for the potential dial-in number, wherein the obtaining is based at least in part on comparing the potential dial-in number to a database of dial-in numbers, and wherein the obtaining comprises recognizing a code associated with the potential dial-in number;
   determining that the potential dial-in number is not a dial-in number in the database of dial-in numbers;
   identifying a confidence level for the conference sequence;
   receiving, at the mobile device and after obtaining the conference sequence, a user input to utilize the conference sequence; and
   utilizing, at the mobile device and automatically in response to the user input, the conference sequence to access a conference when the confidence level is above a threshold.

2. The method of claim 1, further comprising:
   assigning the confidence level to the potential dial-in number based on at least one of a previously identified number, a proximity to a key word, a proximity to other conference call information, or a number of digits in the potential dial-in number.

3. The method of claim 1, wherein the database comprises a remote database.

4. The method of claim 1, wherein the database comprises a database stored on the mobile device.

5. The method of 1, wherein the conference sequence comprises a telephone number and at least one of a code or a personal identification number (PIN).

6. The method of claim 1, wherein obtaining the conference sequence comprises obtaining a host code.

7. The method of claim 1, wherein utilizing the conference sequence comprises initiating a voice-over-internet-protocol (VoIP) call.

8. The method of claim 1, wherein utilizing the conference sequence comprises initiating a video conference call.

9. The method of claim 1, wherein the potential dial-in number comprises a uniform resource locator (URL).

10. An apparatus for facilitating conference calling from a mobile device, the apparatus comprising:
    a processor;
    memory in electronic communication with the processor; and
    instructions stored in the memory, the instructions executable by the processor to:
       locate, automatically with a first application on the mobile device, a potential dial-in number from a second application on the mobile device;
       obtain, at the mobile device and before receiving input from a user, a conference sequence for the potential dial-in number, wherein the obtaining is based at least in part on comparing the potential dial-in number to a database of dial-in numbers, and wherein the obtaining comprises recognizing a code associated with the potential dial-in number;
       determine that the potential dial-in number is not a dial-in number the database of dial-in numbers;
       identify a confidence level for the conference sequence;
       receive, at the mobile device and after obtaining the conference sequence, a user input to utilize the conference sequence; and
       utilize, at the mobile device and automatically in response to the user input, the conference sequence to access a conference when the confidence level is above a threshold.

11. The apparatus of claim 10, wherein the instructions are executable by the processor to:
    assign the confidence level to a potential dial-in number based on at least one of a previously identified number, a proximity to a key word, a proximity to other conference call information, or a number of digits in the potential dial-in number.

12. The apparatus of claim 10, wherein the database comprises a remote database.

13. The apparatus of claim 10, wherein the database comprises a database stored on the mobile device.

14. A computer program product for facilitating conference calling from a mobile device, the computer program product comprising a non-transitory computer readable medium, the computer readable medium storing instructions thereon, the instructions being executable by a processor to:
    locate, automatically with a first application on the mobile device, a potential dial-in number from a second application on the mobile device;
    obtain, at the mobile device and before receiving input from a user, a conference sequence for the potential dial-in number, wherein the obtaining is based at least in part on comparing the potential dial-in number to a database of dial-in numbers, and wherein the obtaining comprises recognizing a code associated with the potential dial-in number;
    determine that the potential dial-in number is not a dial-in number in the database of dial-in numbers;

identify a confidence level for the conference sequence;

receive, at the mobile device and after obtaining the conference sequence, a user input to utilize the conference sequence; and utilize, at the mobile device and automatically in response to the user input, the conference sequence to access a conference when the confidence level is above a threshold.

15. The computer program product of claim 14, wherein the instructions are executable by the processor to:

assign the confidence level to a potential dial-in number based on at least one of a previously identified number, a proximity to a key word, a proximity to other conference call information, or a number of digits in the potential dial-in number.

16. The computer program product of claim 14, wherein the database comprises a remote database.

17. The computer program product of claim 14, wherein the database comprises a database stored on the mobile device.

18. The apparatus of claim 10, wherein the conference sequence comprises a telephone number and at least one of a code or a personal identification number (PIN).

19. The apparatus of claim 10, wherein obtaining the conference sequence comprises obtaining a host code.

20. The apparatus of claim 10, wherein the instructions are executable by the processor to:

utilize the conference sequence by initiating a voice-over-internet-protocol (VoIP) call.

\* \* \* \* \*